March 31, 1970     P. K. BEATENBOUGH ET AL     3,503,377
CONTROL VALVE
Filed July 30, 1968     3 Sheets-Sheet 2
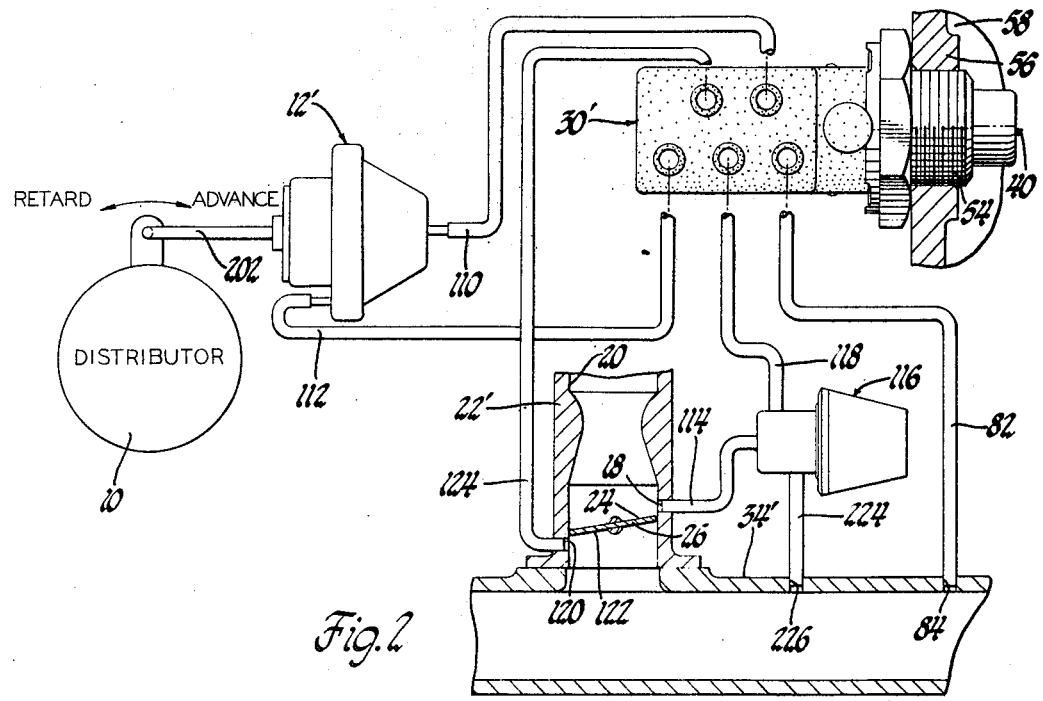
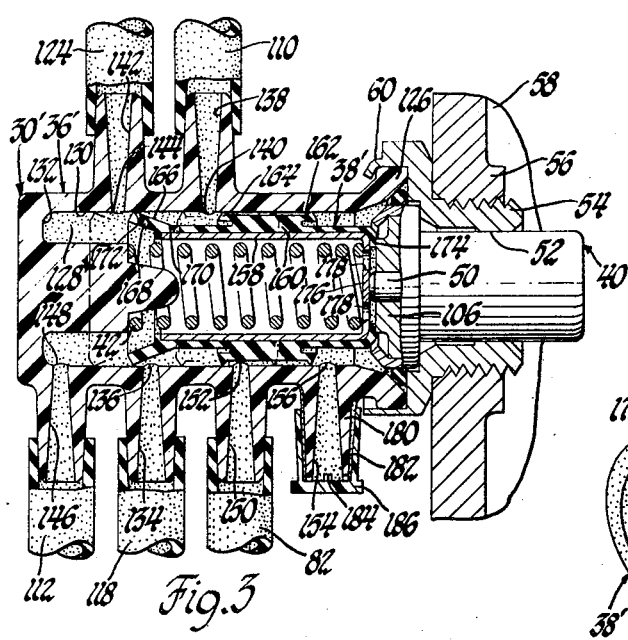
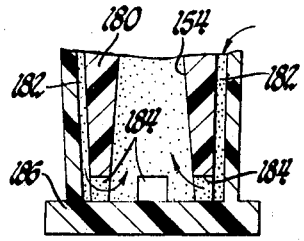
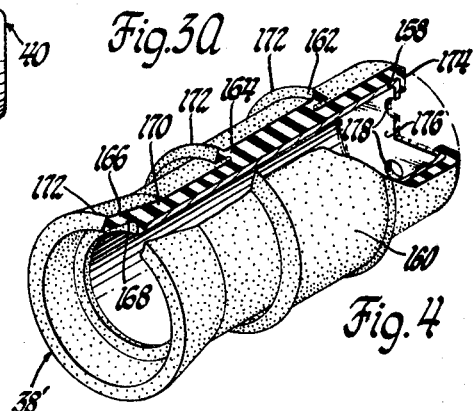
INVENTORS
Paul K. Beatenbough,
John A. Gardner, Jr., &
Ward H. Hutchins
C. K. Veenstra
ATTORNEY

United States Patent Office 3,503,377
Patented Mar. 31, 1970

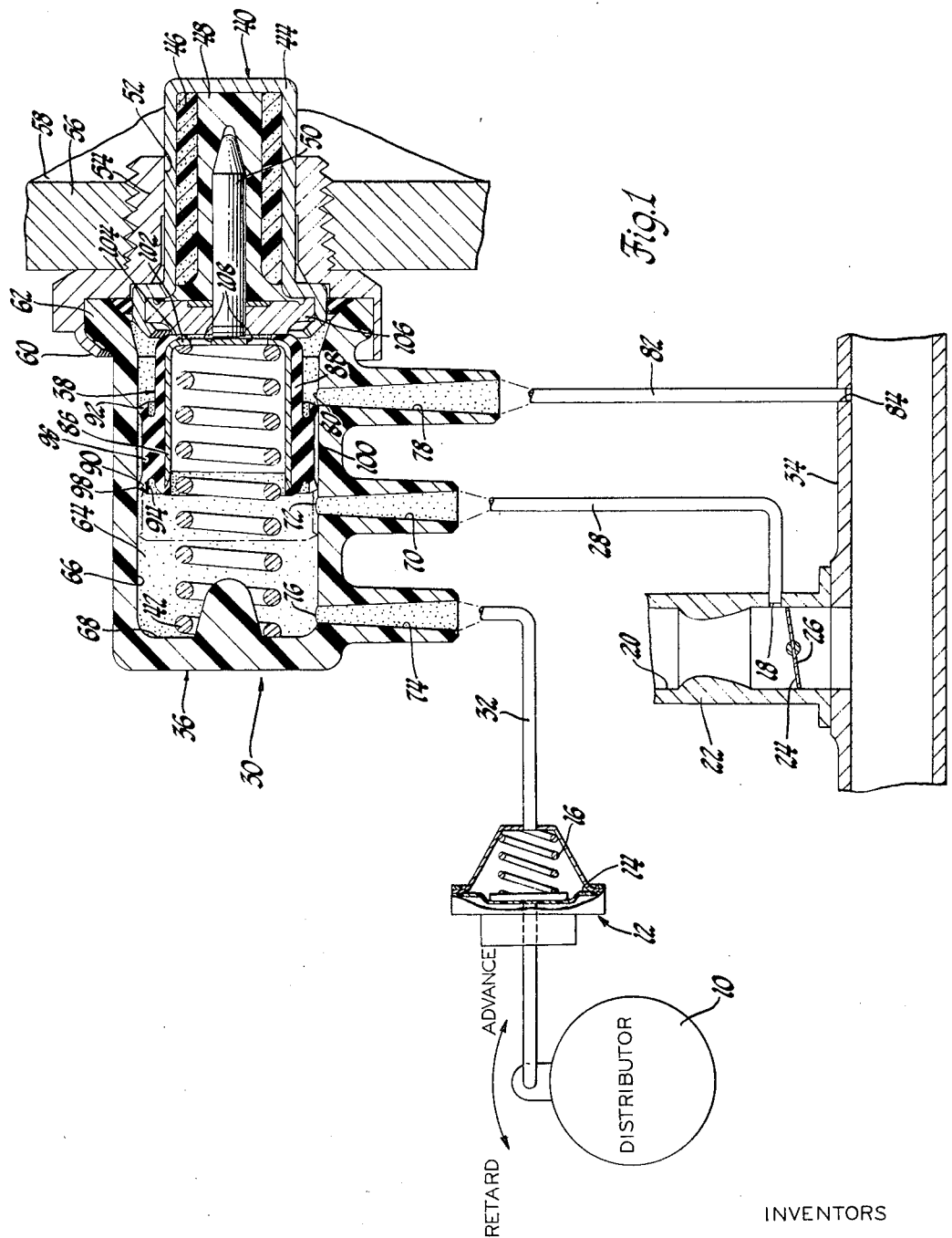

3,503,377
CONTROL VALVE
Paul K. Beatenbough, Medina, John A. Gardner, Jr.,
Newfane, and Ward H. Hutchins, Lockport, N.Y., assignors to General Motors Corporation, Detroit, Mich.,
a corporation of Delaware
Filed July 30, 1968, Ser. No. 749,923
Int. Cl. F02p 5/10; F16k 11/02
U.S. Cl. 123—117                                6 Claims

ABSTRACT OF THE DISCLOSURE

A thermostatically responsive valve for directing vacuum ignition timing signals to the distributor vacuum control assembly comprises a slide valve incorporating a pair of resilient radial lip members.

BACKGROUND OF THE INVENTION

Patent 3,301,242 issued in the name of A. Candelise schematically discloses an arrangement by which the ignition timing of an internal combustion engine is retarded to reduce the proportion of unburned constituents in the engine exhaust gases when the engine is idling but in which the ignition timing is advanced if the idling engine starts to overheat. The earler systems putting that arrangement to use incorporated a control valve in which a pellet thermostat operated a slide valve to selectively connect the distributor vacuum control assembly for response either to the pressure at a carburetor spark port or to the intake manifold pressure. In that control valve, the slide valve was disposed in the bore of a zinc die cast housing and traversed a system of ports opening into the bore; O rings retained in lands on the slide valve effected the necessary seal between the slide valve and the housing.

For satisfactory performance and durability, it was necessary that the rubber O rings, acting as sliding seals, be kept under optimum compression to give the least amount of sliding friction and still provide an adequate seal. Therefore, it was necessary that the bore surface within the housing and the spool valve land surfaces be machined to very smooth conditions and to very close, matching tolerances. This required reaming of the bore in the zinc housing and centerless grinding of the external surfaces of the spool valve. Then, to prevent the O rings from being cut as they passed over the ports in the housing, a secondary coining operation was required to break and smooth the sharp edges at the interface of the port holes and the housing bore.

It will be appreciated that the complexity of such operations left a desire for a simplified control valve design to permit a reduction in the manufacturing costs. In addition, it was desired to improve the durability of the control, which was limited by the life of the rubber O ring seals in the high temperature environment of the engine compartment.

SUMMARY OF THE INVENTION

A control valve design which satisfies these desires is disclosed herein. This design incorporates a slide valve which comprises a sealing element molded over a drawn cup member. The sealing element has a pair of resilient radial lip members which engage the housing bore to provide the necessary seal. The radial lip members do not exhibit the same compression set characteristics as the O rings and thus have a longer operational life. In addition, the resiliency of the lip members permits some tolerance variations in the housing bore and also permits some draft or taper in the bore. Thus the housing may be molded of plastic with commercial draft and a certain amount of out-of-roundness without sacrificing the requisite sealing characteristics. Moreover, the radial lip members are not damaged by the interface formed between the port holes and the housing bore during the molding operation, and the housing may therefore be used in an as-molded condition.

The details as well as other objects and advantages of this invention are shown in the drawings and disclosed in the description of two embodiments of the control valve, designed for different ignition timing control systems.

SUMMARY OF THE DRAWINGS

FIGURE 1 is a sectional view of one embodiment of the control valve, schematically showing its connections to the distributor vacuum control assembly, carburetor, and intake manifold;

FIGURE 2 is a view showing a second embodiment of this control valve, schematically indicating its connections to the distributor vacuum control assembly, carburetor, and intake manifold;

FIGURE 3 is an enlarged sectional view of the second embodiment of the control valve, showing the relationship of the slide valve to the ports in the housing bore;

FIGURE 3A is an enlarged view of a portion of FIGURE 3 illustrating the atmospheric vent opening into the control valve;

FIGURE 4 is an enlarged, pictorial view of the slide valve used in the second embodiment of the control valve, with portions broken away to show the openings in the base of the cup member;

DESCRIPTION OF THE PREFERRED EMBODIMENTS

Figure 5:
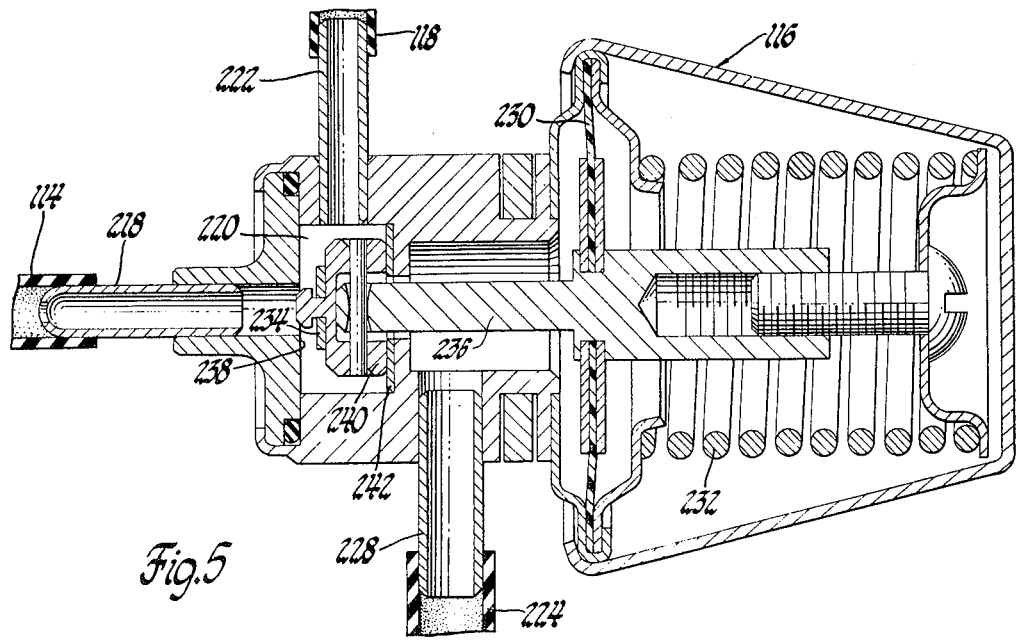
FIGURE 5 is an enlarged sectional view illustrating the details of a valve shown in FIGURE 2.

Referring first to FIGURE 1, the ignition distributor 10 of an internal combustion engine has a conventional vacuum control assembly 12 connected thereto for the purpose of advancing the ignition timing as a vacuum signal is applied against the diaphragm 14 in opposition to the bias of a spring 16. The vacuum ignition timing control signals are normally derived from a spark advance port 18 opening from the combustion air induction passage or inlet 20 of a carburetor 22 just above the upstream edge 24 of the carburetor throttle 26. When throttle 26 is in the engine idling position, as shown in the drawing, the essentially atmospheric pressure in intake passage 20 above throttle 26 is sensed by diaphragm 14 through a conduit 28, the control valve 30, and a conduit 32. As throttle 26 is opened, however, its upstream edge 24 traverses port 18, and diaphragm 14 senses the vacuum in the intake manifold 34 below throttle 26. It will be appreciated, therefore, that the ignition timing is advanced by the action of intake manifold vacuum against diaphragm 14 when throttle 26 is opened from its idling position and is retarded by spring 16 when throttle 26 is closed to its idling position.

In some circumstances when an engine is subjected to prolonged periods of idling operation with retarded ignition timing, the engine temperature tends to increase to an undesirable level. This condition may be alleviated by advancing the ignition timing, and control valve 30 is provided for this purpose. Control valve 30 includes a housing 36 containing a slide valve 38 operated by a thermostatic actuator 40 against the bias of a spring 42.

Thermostatic actuator 40 includes an outer casing 44 containing a mass of thermally expansible material 46. As material 46 expands, it compresses a seal 48 and ejects a plunger 50 which moves slide valve 38 toward the left.

Thermostatic actuator 40 projects through an opening 52 in an element 54 threadedly received in the wall 56 of an engine cooling water passage 58. An outer rim 60 of element 54 is crimped over a flange 62 of housing 36 to secure the parts of control valve 30.

Housing 36 has an axially extending chamber or recess 64 defined by a substantially cylindrical inner wall or bore 66 and one end wall 68 and enclosed at the opposite end by thermostatic actuator 40. Housing 36 also has a plurality of radially extending passages including a passage 70 leading from conduit 28 to a port 72 opening into bore 66, a passage 74 leading to conduit 32 from a port 76 opening from bore 66, and a passage 78 which provides communication between a port 80 opening into bore 66 and a conduit 82 leading from a tap 84 in intake manifold 34.

Slide valve 38 includes an inner, cup-shaped element 86 about which an elastomeric sealing element 88 is molded. Sealing element 88 has a pair of resilient radial lip members 90 and 92, each comprising a frustoconical portion 94 extending from a base portion 96 to a sharp feathered edge or lip portion 98. When slide valve 38 is assembled in housing 36, the radial lip members 90 and 92 are radially compressed, and the resiliency of the elastomer provides a bias which maintains the lip portions 98 in continuous peripheral contact with the bore 66. Radial lip members 90 and 92 extend in opposite directions from the base portion 96 in an area intermediate the ends of the inner element 86 and provide an annular space 100 about slide valve 38 to allow for an even distribution of forces on slide valve 38.

In operation, as the temperature of the coolant in passage 58 approaches 220° F., material 46 begins to expand and slide valve 38 is forced to the left. By the time the coolant temperature has reached 230° F., lip portion 98 of radial lip element 90 has traversed and sealed off port 72, as indicated in FIGURE 1, to prevent vacuum control assembly 12 from sensing the pressure at carburetor port 18. At the same time, an annular portion 102 of sealing element 88, which overlies the base portion 104 of cup-shaped element 86 and which was seated against a plate 106, is moved away from plate 106. The annular seal which was thus formed between annular portion 102 and plate 106 is broken, and communication between opposite ends of chamber 66 is thus permitted through a pair of openings 108 in base portion 104 of cup-shaped element 86. Thus as the engine temperature approaches an undesirably high value, diaphragm 14 is subjected to intake manifold vacuum through conduit 32, passage 74, port 76, openings 108, port 80, passage 78, conduit 82, and port 84, and the engine ignition timing is advanced.

Figure 6:
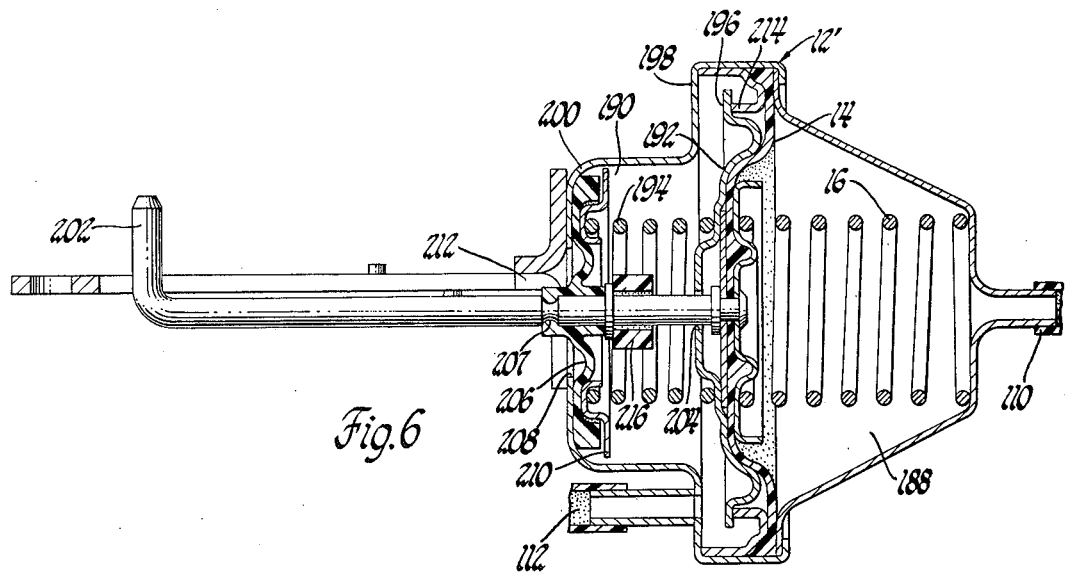
FIGURE 6 is an enlarged sectional view illustrating the details of the distributor vacuum control assembly shown in FIGURE 2.

The engine timing control system shown in FIGURE 2 provides the timing control features outlined above and also provides additional retard of the ignition timing when the engine is idling. In this system the ignition distributor 10 has a vacuum control assembly 12' similar to that disclosed in Patent 2,087,339 issued in the name of J. L. Arthur; vacuum control assembly 12' is shown in FIGURE 6 and will be described below. It is noted, however, that separate conduits 110 and 112 are connected to vacuum control assembly 12' to supply vacuum ignition timing advance and retard signals respectively.

The vacuum advance signals are derived from spark advance port 18 in carburetor 22' and delivered through a conduit 114, a deceleration control valve 116 (which is disclosed in FIGURE 5 and which will be described below), a conduit 118, control valve 30', and conduit 110.

The vacuum retard signals are derived from a spark retard port 120 opening from air induction passage 20 of carburetor 22' just below the downstream edge 122 of carburetor throttle 26. From spark retard port 120, the vacuum retard signals are delivered through a conduit 124, control valve 30', and conduit 112.

When throttle 26 is in the engine idling position, as shown in the drawing, the essentially atmospheric pressure at advance port 18 is sensed by the advance portion of vacuum control assembly 12' while the induction vacuum at retard port 120 below throttle 26 is sensed by the retard portion of vacuum control assembly 12' and a relatively high degree of ignition timing retard is imparted to distributor 10. As throttle 26 is opened, however, its upstream edge 24 traverses advance port 18 and manifold vacuum is transmitted to the advance portion of vacuum control assembly 12' to cause normal vacuum advance of the ignition timing; at the same time the retard portion of vacuum control assembly 12' is vented to the essentially atmospheric pressure above throttle 26 as the downstream edge 122 of throttle 26 traverses retard port 120. It will be appreciated, therefore, that the ignition timing is advanced by the action of intake manifold vacuum through advance port 18 when throttle 26 is opened from its idling position and is highly retarded by the action of intake manifold vacuum through port 120 when throttle 26 is closed to its idling position.

As mentioned above, when the engine is subjected to prolonged periods of idling operation with such a high degree of ignition timing retard, the engine temperature may increase to an undesirable level. This condition may be alleviated by advancing the ignition timing, and a modified control valve 30' is provided for this purpose in this system. As shown in FIGURE 3, control valve 30' includes a housing 36' containing a slide valve 38' operated by thermostatic actuator 40 against the bias of spring 42.

Thermostatic actuator 40 is the same as described above and projects through opening 52 in element 54 threadedly received in wall 56 of engine cooling water passage 58. Outer rim 60 of element 54 is crimped over a flange 126 of housing 36' to secure the parts of control valve 30'.

Housing 36' has an axially extending chamber or recess 128 defined by a substantially cylindrical inner wall or bore 130 and one end wall 132 and enclosed at the opposite end by thermostatic actuator 40. Housing 36 also has a plurality of radially extending passages including a carburetor advance passage 134 leading from conduit 118 to a port 136 opening into bore 130, a distributor advance passage 138 leading to conduit 110 from a port 140 opening from a bore 130, a carburetor retard passage 142 leading from conduit 124 to a port 144 opening into bore 130, a distributor retard passage 146 leading to conduit 112 from a port 148 opening from bore 130, a manifold tap passage 150 which provides communication between a port 152 opening into bore 130 and conduit 82 leading from tap 84 in intake manifold 34', and a vent passage 154 opening from the atmosphere through a port 156 into bore 130.

Slide valve 38' includes an inner, cup-shaped element 158 about which an elastomeric sealing element 160 is molded. Sealing element 160 has three resilient radial lip members 162, 164, and 166, each comprising a frustoconical portion 168 extending from a base portion 170 to a sharp, feathered edge or lip portion 172. When the slide valve 38' is assembled in housing 36', the radial lip members 162, 164, 166 are radially compressed, and the resilience of the elastomer provides a bias which maintains the lip portions 172 in continuous peripheral contact with the bore 130.

When the engine is operating under normal temperature conditions, below 220° F., the slide valve 38' is in the position shown in FIGURE 3. Communication is then provided between the carburetor advance and distributor advance passages and ports 134, 136 and 138, 140 through the annular space about slide valve 38' between radial lip members 164 and 166. Communication is also provided between carburetor retard and distributor retard passages and ports 142, 144 and 146, 148 through the portion of the chamber 128 to the left of slide valve 38'. As the temperature of the coolant in passage 58 approaches 220° F., material 46 within thermostatic actuator 40 begins to expand and slide valve 38' is forced to the left. By the time the coolant temperature has reached 230° F., radial lip member 164 has traversed distributor advance port 140, as indicated in FIGURE 3, to prevent vacuum control assembly 12' from sensing the pressure at carburetor port 18. At the same time, radial lip member 166 has traversed carburetor retard port 144 to prevent vacuum control assembly 12' from sensing the manifold vacuum at carburetor spark retard port 120. In addition, as radial lip member 164 traverses distributor advance port 140, it places distributor advance passage and port 138, 140 in communication with manifold tap passage and port 150, 152. Thus as the engine temperature approaches an undesirably high value, the advance portion of vacuum control assembly 12' is subjected to intake manifold vacuum through conduit 110, distributor advance passage 138, distributor advance port 140, the annular space surrounding slide valve 38' between radial lip members 162 and 164, manifold tap port 152, manifold tap passage 150, conduit 82, and tap 84, and the engine ignition timing is advanced.

As slide valve 38' is forced to the left, an annular portion 174 of sealing element 160, which overlies the base portion 176 of cup-shaped element 158 and which was seated against plate 106, is moved away from plate 106. The annular seal which was thus formed between annular portion 174 and plate 106 is broken, and communication between opposite ends of chamber 128 is thus permitted through a pair of openings 178 in base portion 176 of cup-shaped element 158. Air which thus enters the right-hand end of chamber 128 through vent passage and port 154, 156 is communicated through distributor retard port and passage 148, 146 to the retard portion of vacuum control assembly 12' to prevent any vacuum otherwise retained from exerting an ignition timing retard influence on distributor 10.

FIGURE 3A illustrates in enlarged detail the manner in which air enters vent passage 154. It is noted that the projection 180 which forms passage 154 has a plurality of outwardly extending ridges 182 formed along the sides thereof and a plurality of notches 184 formed in the end thereof. A cap 186 is secured over projection 180, and the space between cap 186 and projection 180 provided by ridges 182 and notches 184 permits air to flow into passage 154.

Vacuum control assembly 12' is shown in detail in FIGURE 6. Referring to FIGURE 6, when the carburetor throttle is closed essentially atmospheric pressure is normally supplied through conduit 110 to the chamber 188 on the right of diaphragm 14 and vacuum retard signals are supplied through conduit 112 to the chamber 190 on the left of diaphragm 14. Diaphragm 14 and a sheet metal washer 192 are pulled back against a spring 194 until the rim 196 of washer 192 engages a shoulder 198 in the casing 200 of assembly 12'. A plunger 202, secured to diaphragm 14 and extending through an opening 204 in washer 192, is thus moved to adjust the setting of distributor 10.

It is noted that a flexible diaphragm seal 206 retained in a groove 207 on plunger 202 closes the opening 208 in casing 200 and is biased into sealing engagement with casing 200 by the force of spring 194 exerted against a spring seat member 210. A bracket 212 is secured to casing 200 to mount assembly 12' on distributor 10.

When throttle 26 is opened, essentially atmospheric pressure is supplied through conduit 112 to chamber 190 and vacuum advance signals are supplied through conduit 110 to chamber 188. Spring 194 then returns washer 192 to the neutral position shown, moving washer 192 away from shoulder 198 to an annular stop 214. The vacuum advance signal in chamber 188 pulls diaphragm 14 away from washer 192, and diaphragm 14 and plunger 202 are moved toward the right against the bias of spring 16 until an annular stop member 216 surrounding plunger 202 abuts washer 192.

In some systems using vacuum control assembly 12', it has been found undesirable to provide the additional retard during closed throttle engine decelerations from high speeds. Control valve 116 has been provided to prevent such additional retard under those operating conditions. Referring to FIGURE 5, conduit 114 extending from carburetor advance port 18 is connected to a fitting 218 opening into a valve chamber 220 and is normally in communication with a fitting 222 to which conduit 118 is connected. A conduit 224 extending from a tap 226 in intake manifold 34' is connected to a fitting 228 from which intake manifold vacuum may be applied against the left hand side of a diaphragm 230. When the engine is decelerating from high speeds with closed throttle, the induction vacuum is very high (21″ Hg, for example) and diaphragm 230 is thereby moved toward the left against the bias of a spring 232. A valve element 234, carried within valve chamber 220 on the end of a plunger 236 secured to diaphragm 230, seats against a shoulder 238 within valve chamber 220 and prevents communication between fittings 218 and 222. At the same time, a member 240 carried on the end of plunger 236 is moved away from a valve seat 242 to open communication between fittings 228 and 222.

Thus during high speed engine decelerations, manifold vacuum is applied both to the right side of diaphragm 14 in vacuum control assembly 12' (through conduit 110, control valve 30', conduit 118, fitting 222, valve chamber 220, fitting 228, conduit 224, and tap 226) and to the left side of diaphragm 14 (through conduit 112, control valve 30', conduit 124, and spark retard port 120). When the same pressure is applied to both the right and left sides of diaphragm 14, diaphragm 14 is not moved from the neutral position shown in FIGURE 6, and no additional retard is imparted to distributor 10.

From the foregoing description, it will be appreciated that control valves 30 and 30' have special advantages when used in the ignition timing control systems disclosed herein. It should be further appreciated, however, that the advantages of the control valve designs are not limited to use in the disclosed systems and that these control valves have substantial advantages when used in switching valves in other fluid systems.

What is claimed is:

1. A control valve including a housing having a substantially cylindrical inner wall defining an axially extending chamber, said housing also having a plurality of passages extending radially therethrough, said passages terminating respectively in axially spaced ports in said wall opening into said chamber, a slide valve disposed for axially reciprocating motion in said chamber, and actuator means for imparting reciprocating motion to said slide valve, and wherein said slide valve comprises a substantially cylindrical inner element and a sealing element molded about and bonded to the exterior of said element, said sealing element having a pair of resilient radial lip members extending in opposite directions from an area intermediate the ends of said inner element and defining an anular space about said slide valve axially bounded by said radial lip members and radially bounded by said slide valve and said chamber wall, each of said radial lip members including a frustoconical portion extending generally axially and slightly radially from a base portion adjacent said inner element to a lip portion engaging said chamber wall, the entire periphery of each said lip portion being biased into engagement with said chamber wall by the resilience of its associated radial lip member, predetermined axial motion of said slide valve within said chamber causing one lip portion to traverse one of said ports and block fluid communication between said traversed port and another of said ports, said predetermined axial motion of said slide valve further providing fluid communication between said traversed port and said annular space about said slide valve to permit uniform exertion of the fluid pressure in the passage associated with said traversed port upon said slide valve and thereby prevent binding of said slide valve against said chamber wall.

2. A control valve including a housing having a substantially cylindrical inner wall and spaced end walls defining an axially extending chamber, a slide valve disposed for axially reciprocating motion in said chamber, said slide valve comprising a cup shaped inner element and a sealing element molded about and bonded to the exterior of said inner element, said sealing element having a pair of resilient radial lip members extending in opposite directions from an area intermediate the ends of said inner element, each of said radial lip members including a frustoconical portion extending generally axially and slightly radially from a base portion adjacent said inner member to a lip portion engaging said housing inner wall, the entire periphery of each said lip portion being biased into engagement with said housing inner wall by the resilience of the associated radial lip member, said cup shaped inner element having a base portion with opening means extending therethrough to provide fluid communication between opposite ends of said slide valve, said sealing element further defining an annular valve portion surrounding said opening means on said base portion of said inner element, spring means normally biasing said slide valve to seat said annular valve portion against one of said housing end walls and prevent fluid communication between opposite ends of said chamber, said housing having three passages extending radially therethrough, said passages terminating in axially spaced ports in said housing inner wall opening into said chamber, said ports including a first port disposed adjacent said one housing end wall, a second port disposed adjacent the other housing end wall and normally blocked from fluid communication with said first port by at least one of said radial lip members and by seating of said annular valve portion against said one end wall, and a third port disposed intermediate said first and second ports and normally in fluid communication with said second port and normally blocked from fluid communication with said first port by said one radial lip member and by seating of said annular valve portion against said one end wall, and thermostatic means for imparting predetermined axial motion to said slide valve against the bias of said spring means upon a certain temperature change to cause said lip portion of said one radial lip member to traverse said third port whereby said third port is blocked from fluid communication with said first and second ports by said radial lip elements and to unseat said annular valve element from said one end wall whereby said second port is placed in fluid communication with said first port through said opening means in said base portion of said slide valve inner element.

3. An ignition timing control for an internal combustion engine having an inlet for combustion air flow to the engine, a throttle rotatably disposed in said inlet for controlling air flow therethrough, said inlet having a control port opening therefrom at a point upstream of said throttle during closed throttle conditions and downstream of said throttle during open throttle conditions, and pressure responsive means for advancing the engine ignition timing in response to a decrease in pressure and for retarding the engine ignition timing in response to an increase in pressure, said ignition timing control comprising the control valve of claim 2 wherein the passage associated with said second port is connected to said pressure responsive means and wherein the passage associated with said third port is connected to said control port opening from said combustion air inlet whereby the engine ignition timing is normally controlled by said pressure responsive means in response to variations in the pressure in said inlet at said control port, wherein said thermostatic means is responsive to engine operating temperatures and imparts predetermined axial motion to said slide valve when engine operating temperatures approach a safe upper limit and wherein said third port is connected to said inlet downstream of said throttle irrespective of throttle position whereby the engine ignition timing is controlled by the pressure in said inlet downstream of said throttle irrespective of throttle position when the engine operating temperature approaches the safe upper limit.

4. A control valve including a housing having a substantially cylindrical inner wall and spaced end walls defining an axially extending chamber, a slide valve disposed for axially reciprocating motion in said chamber, said slide valve comprising a cup shaped inner element and a sealing element molded about and bonded to the exterior of said inner element, said sealing element having first and and second resilient radial lip members extending in opposite directions from an area intermediate the ends of said inner element and an additional resilient radial lip member extending from one end of said inner element, each of said lip members including a frustoconical portion extending generally axially and slightly radially from a base portion adjacent said inner element to a lip portion engaging said housing inner wall, the entire periphery of each said lip portion being biased into engagement with said housing inner wall by the resilience of the associated radial lip member, said cup shaped inner element having a base portion at the end opposite said additional lip member, said base portion having an opening means extending therethrough to provide fluid communication between opposite ends of said slide valve, said sealing element further defining an annular valve portion surrounding said opening means on said base portion of said inner element, spring means normally biasing said slide valve to seat said annular valve portion against one of said housing end walls and prevent fluid communication between opposite ends of said chamber, said housing having six passages extending radially therethrough, said passages terminating in axially spaced ports in said housing inner wall opening into said chamber, said ports including a first port disposed adjacent said one housing end wall, a second port disposed adjacent the other housing end wall and normally blocked from fluid communication with said first port by said radial lip members and by seating of said annular valve portion against said one end wall, a third port disposed intermediate said first and second ports and normally in fluid communication with said second port and blocked from fluid communication with said first port by said radial lip members, a fourth port disposed intermediate said first and third ports and normally blocked from fluid communication with said third port by said additional radial lip member and blocked from fluid communication with said second port by said additional radial lip member and blocked from fluid communication with said first port by said first and second radial lip members, a fifth port disposed intermediate said first and fourth ports and normally in fluid communication with said fourth port and blocked from fluid communication with said first and second and third ports by said radial lip members, and a sixth port disposed intermediate said first and fifth ports and normally blocked from fluid communication with said fifth port by said first radial lip member and blocked from communication with said first and second and third and fourth ports by said first and second radial lip members, and thermostatic means for imparting predetermined axial motion to said slide valve against the bias of said spring means upon a certain temperature change to cause said lip portion of said additional radial lip member to traverse said third port whereby said third port is blocked from fluid communication with said second port and is placed in fluid communication with said fourth port and to cause said lip portion of said first radial lip member to traverse said fifth port whereby said fifth port is blocked from fluid communication with said fourth port and is placed in fluid communication with said sixth port and to unseat said annular valve portion from said one end wall whereby said second port is placed in fluid communication with said first port through said opening means in said base portion of said slide valve inner element.

5. An ignition timing control for an internal combustion engine having an inlet for combustion air flow to the engine, a throttle rotatably disposed in said inlet for controlling air flow therethrough, said inlet having an advance port opening therefrom at a point upstream of said throttle during closed throttle conditions and downstream of said throttle during open throttle conditions, said inlet having a retard port opening therefrom at a point downstream of said throttle during closed throttle conditions and upstream of said throttle during open throttle conditions, first pressure responsive means for advancing the engine ignition timing in response to a decrease in pressure and for retarding the engine ignition timing in response to an increase in pressure, and second pressure responsive means for retarding ignition timing in response to a decrease in pressure and for advancing ignition timing in response to an increase in pressure, said ignition timing control comprising the control valve of claim 4 wherein the passage associated with said fifth port is connected to said first pressure responsive means and wherein the passage associated with said fourth port is connected to said advance port whereby normally the engine ignition timing is advanced during open throttle conditions and retarded during closed throttle conditions, wherein the passage associated with said second port is connected to said second pressure responsive means and wherein the passage associated with said third port is connected to said retard port whereby normally the engine ignition timing is additionally retarded during closed throttle conditions and advanced during open throttle conditions, wherein said thermostatic means is responsive to engine operating temperatures and imparts predetermined axial motion to said slide valve when engine operating temperatures approach a safe upper limit and wherein said sixth port is connected to said combustion air inlet downstream of said throttle irrespective of throttle position whereby the engine ignition timing is advanced irrespective of throttle position when engine operating temperatures approach the safe upper limit, and wherein the passage associated with said first port is connected to atmosphere whereby said second pressure responsive means is prevented from retarding the engine ignition timing when engine operating temperatures approach the safe upper limit.

6. The arrangement of claim 5 wherein the connection between said fourth port and said advance port is provided by a conduit and wherein said conduit includes valve means operative in response to very low pressure in said inlet downstream of said throttle such as occurs during engine deceleration from high speeds to block fluid communication between said fourth port and said advance port and to provide fluid communication between said fourth port and a location in said inlet downstream of said throttle whereby said first and second pressure responsive means are simultaneously subjected to the pressure in said inlet downstream of said throttle to thereby prevent both advance and additional retard of engine ignition timing during engine deceleration from high speeds.

References Cited

UNITED STATES PATENTS

| 2,183,747 | 12/1939 | Jennings | 123—117 |
| 2,471,285 | 4/1949 | Rice | 137—625.43 |
| 2,782,801 | 2/1957 | Ludwig | 251—358 |
| 3,301,242 | 1/1967 | Candelise | 123—117 |
| 3,400,698 | 9/1968 | Kelly | 123—117 |

FOREIGN PATENTS 858,804 1/1961 Great Britain.

MARK M. NEWMAN, Primary Examiner

D. HART, Assistant Examiner

U.S. Cl. X.R.

137—625.42; 251—324, 358